UNITED STATES PATENT OFFICE.

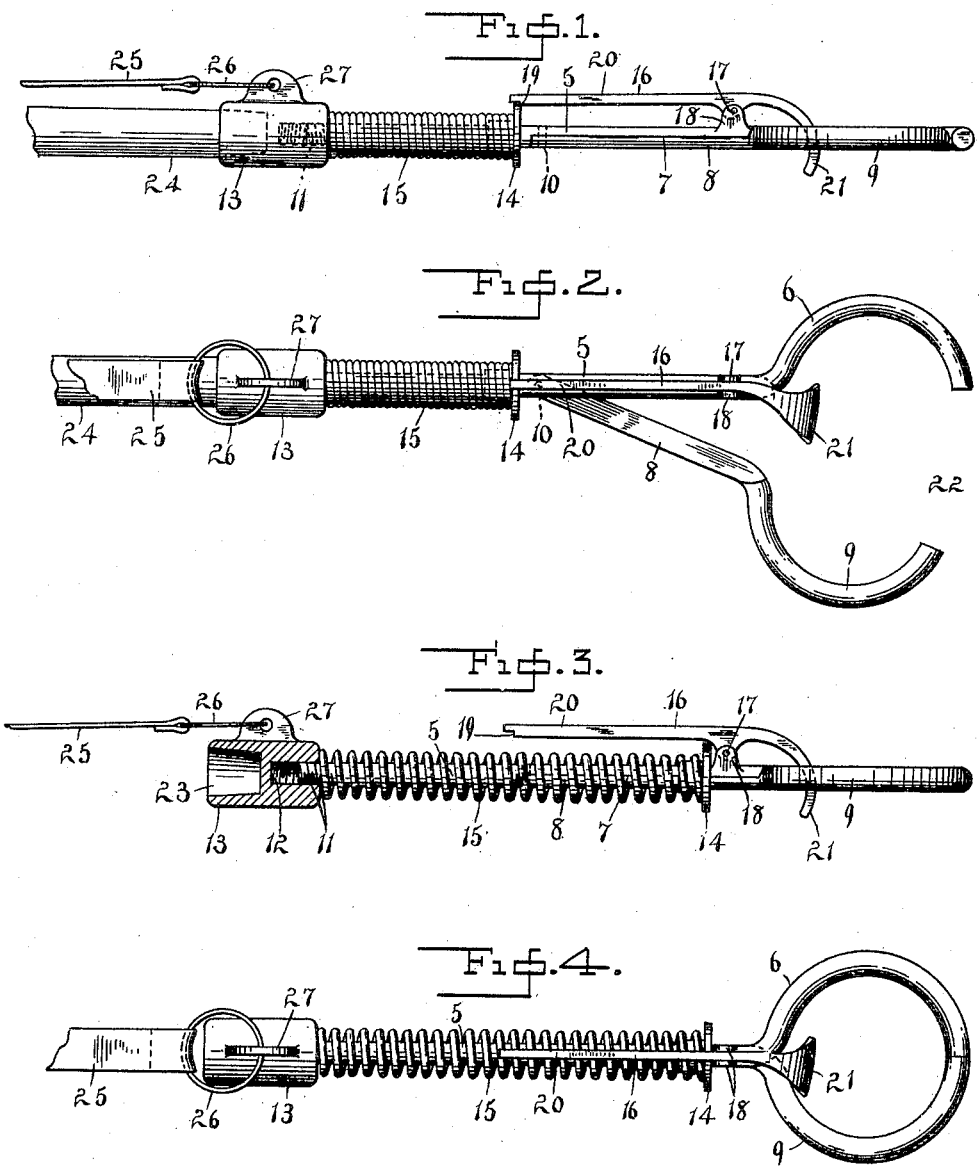

ROBERT A. MORRIS, OF ELBERFELD, INDIANA.

ANIMAL CATCHING AND HOLDING DEVICE.

983,248.　　　　Specification of Letters Patent.　　Patented Jan. 31, 1911.

Application filed July 2, 1908.　Serial No. 441,688.

*To all whom it may concern:*

Be it known that I, ROBERT A. MORRIS, citizen of the United States, residing at Elberfeld, in the county of Warrick and State of Indiana, have invented certain new and useful Improvements in Animal Catching and Holding Devices, of which the following is a specification.

My invention relates to gripping devices and has special reference to appliances designed for seizing and holding animals being particularly useful in capturing pigs, sheep and other domestic animals of comparatively small size. The device belongs to that class in which an elongated implement equipped at the end with a gripping mechanism is employed to seize the leg of an animal without the necessity of approaching so closely as to alarm it before it can be seized.

The chief objects of the improvements which form the subject matter of this application are:—to provide a simple, effective and durable appliance for the purpose stated, and to furnish a gripping device that will be of comparatively light weight, and at the same time of sufficient strength to withstand the struggles of the captured animal without danger of becoming broken.

Further objects of my invention are to provide an automatic tripping device for the holding means thus insuring the seizure of the limb at the exact moment of engagement by the implement; to so mount the grip portion upon an extended handle that it can be instantly detached therefrom, and the tension of a rope or strap be substituted therefor, and to supply a device that can be manufactured economically.

I accomplish the above and other minor objects by the employment of the mechanism illustrated in the accompanying drawing forming a part of this application, and in which the various details of construction are disclosed in the following views.

Figure 1 is a side elevation of my improved animal catching implement, a portion of the handle and holding strap being broken away; Fig. 2 is a top plan view, and Figs. 3 and 4 are, respectively, side and plan views of the apparatus, showing the jaws closed and locked in gripping position.

In a general way the appliance may be described as consisting of a pair of gripping jaws held loosely attached to the end of a long pole or handle and retained temporarily in place by the aid of a strap, means for holding the jaws apart, and a tripping device adapted to release a jaw closing spring by coming in contact with the object to be seized.

Referring to the details of the drawing, the numeral 5 indicates the stem or body of a gripping member formed of a round rod or heavy wire curved at one end into a semi-circular jaw 6. The said body is flattened or halved throughout a portion of its length as indicated at 7, and to this is applied the halved stem 8 of a companion jaw, its end 9 being curved to correspond with the jaw 6. The stem 8 is pivotally attached to the fixed stem or body 5 at 10, and when the parts are in the position shown in Fig. 4 the extremities of the semi-circular jaws meet to form a complete ring. The rear end of the fixed stem 5 is furnished with threads 11 which engage similar threads in a hole 12 formed in a cylindrical socket piece 13. Upon the combined stems of the jaws is slidably mounted a collar or washer 14, and between this collar and the said socket piece 13 and surrounding the said stems is a spiral spring 15, the ends of which abut against the socket piece 13, and the said collar, and tend to slide the collar 14 outwardly toward the curved jaws. Upon the stem 5 of the fixed jaw is mounted a latch or trigger 16 pivoted at 17 to ears 18 formed integral with the steam 5. The said trigger extends rearwardly to a point beyond the joint 10 of the jaws and is furnished with a shoulder 19 formed by a notch upon the under side near the end. The collar 14 being slidable as previously mentioned may be pressed backward to compress the operating spring 15, and when the said collar has passed beyond the joint 10 it is held in this position by the engagement of the shoulder 19 with its margin, and while the parts are in this relation the movable jaw may be swung upon its pivot 10 to the open position shown in Fig. 2.

It will be readily seen that if the rear end 20 of the trip or trigger is raised sufficiently to disengage the collar 14 the impetus of the spiral spring 15 will thrust the said collar forward and force the jaws suddenly together, the encircling collar holding them securely locked. This tripping action is produced automatically by bending the forward end 21 of the trigger downwardly so that it passes into the space between the curvatures of the jaws and is then flattened laterally to form a suitable contact for engagement with the animal's leg as hereinafter described. This portion 21 is not only curved downward so that it projects considerably below the plane of the pivotal attachment 17, but is also bent laterally in order that it may be in front of and act as a fender for, the interval 22 between the jaws when open, as shown in Fig. 2, and thus prevent the leg of the animal from becoming wedged therein, which might prevent the proper closure of the jaws, and permit the animal to struggle free. As shown in the illustrations the prominence and relative position of the flattened end 21 of the trigger will insure the effectiveness of the trap when used in the manner hereinafter set forth.

The rear end of the member 13 is furnished with a socket 23, which is loosely fitted upon the end of a pole or handle 24, and is temporarily held in engagement with the handle by means of a strap 25, secured to a ring 26 which passes through a projection or ear 27, made integral with the socket piece 13. The threaded end 11 of the fixed jaw is fitted in its socket so that it may be turned in or out for the purpose of adjusting the tension of the operating spring 15.

The method of using my improved animal catching implement is as follows:—The operator first sets the grip by taking hold of the collar and sliding it toward the rear until engaged by the shoulder 19 of the latch or trigger 16 and throwing the movable latch to its open position where it will be held by friction. The gripping device is then placed upon the end of the handle and the operator grasps both handle and strap, keeping the latter under sufficient tension to prevent the device from becoming disengaged from the handle. He then approaches the animal selected and when near enough he advances the gripping jaws so that they pass upon either side of the animal's leg, and the moment the end 21 of the trigger strikes the leg, the spring 15 will be released and close the jaws so as to embrace the limb holding the animal fast. It will usually be found preferable to drop the handle which will become readily disengaged from the grip, and depend upon the strap alone to hold the animal.

The appliance may be made of different sizes to suit the particular animal it is desired to capture, and by reducing the dimensions sufficiently the implement may be made suitable for catching chickens, geese and other fowls as well as larger animals.

Having thus described my invention, what I claim as new, is:—

In a gripping device, a pair of hinged jaws having their ends curved and adapted to form a complete ring when closed, a collar slidable on said jaws, a spring surrounding the jaws and adapted to force said collar toward the curved end to close the jaws, a trip pivoted on one of said jaws and having one end extended and adapted to engage said collar when the spring is compressed, the other end of the trip being curved and extending between said curved ends of the jaws.

In testimony whereof I affix my signature in the presence of two witnesses.

ROBERT A. MORRIS.

Witnesses:
JNO. H. SMITH,
C. M. AYER.